United States Patent [19]

Hirooka et al.

[11] Patent Number: 5,330,813
[45] Date of Patent: Jul. 19, 1994

[54] PATCH FOR PREVENTING CARBURIZATION, NITRIDING OR OXIDATION, AND METHOD OF PREVENTING CARBURIZATION, NITRIDING OR OXIDATION

[75] Inventors: Kouichi Hirooka, Nara; Kouichi Ito, Osaka; Susumu Tanabe, Suita, all of Japan

[73] Assignee: Kabushiki Kaisha Nard Kenkyusho, Amagasaki, Japan

[21] Appl. No.: 20,249

[22] Filed: Feb. 22, 1993

Related U.S. Application Data

[63] Continuation of Ser. No. 613,686, Nov. 20, 1990, abandoned.

[30] Foreign Application Priority Data

Apr. 1, 1989 [JP] Japan ................... 1-83023

[51] Int. Cl.$^5$ ............................................. C23C 8/04
[52] U.S. Cl. ............................... 156/329; 148/14; 148/16; 148/16.5; 148/16.6; 148/20.3; 148/27; 148/206; 148/277; 428/323; 428/325; 428/336; 428/343; 428/352; 428/354; 428/355; 428/447; 428/697; 428/698; 428/702; 428/40
[58] Field of Search ............. 428/40, 323, 325, 343, 428/447, 697, 698, 702, 336, 352, 354, 355; 148/27, 16.5, 16.6, 20.3, 14, 16

[56] References Cited

U.S. PATENT DOCUMENTS

| | | | |
|---|---|---|---|
| 3,151,002 | 9/1964 | Benz | 148/16.5 |
| 3,178,322 | 4/1965 | Schneider | 148/27 |
| 3,445,427 | 5/1969 | Larcher | 428/447 |
| 3,836,380 | 9/1974 | Kramer | 148/14 |
| 3,969,157 | 7/1976 | Hutterer | 148/27 |
| 4,062,702 | 12/1977 | Kunst et al. | 148/14 |
| 4,227,945 | 10/1980 | Kitayama | 148/14 |
| 4,379,806 | 4/1983 | Korpman | 428/354 |
| 4,664,722 | 5/1987 | Clinkscales | 148/14 |
| 4,684,557 | 8/1987 | Pennace | 428/40 |
| 4,762,753 | 8/1988 | Perfetti | 148/27 |
| 5,028,650 | 7/1991 | Enloe | 524/586 |

FOREIGN PATENT DOCUMENTS

| | | | |
|---|---|---|---|
| 306727 | 3/1989 | European Pat. Off. | |
| 2217703 | 10/1973 | Fed. Rep. of Germany | |
| 254960 | 3/1988 | Fed. Rep. of Germany | 148/27 |
| 879735 | 3/1943 | France | |
| 2123785 | 9/1972 | France | |
| 51-50240 | 5/1976 | Japan | |
| 82726 | 6/1980 | Japan | 148/14 |
| 77523 | 5/1983 | Japan | 148/27 |
| 157264 | 7/1986 | Japan | 148/27 |
| 63-111120 | 5/1988 | Japan | |
| 1319627 | 12/1989 | Japan | |
| 473746 | 9/1975 | U.S.S.R. | 148/27 |
| 1372113 | 10/1974 | United Kingdom | |

Primary Examiner—Ellis P. Robinson
Assistant Examiner—Nasser Ahmad
Attorney, Agent, or Firm—Oblon, Spivak, McClelland, Maier & Neustadt

[57] ABSTRACT

A patch for preventing carburization, nitriding or oxidation comprises:

a film comprising a heat-fusible or heat-meltable particulate material having an anti-carburizing, anti-nitriding or anti-oxidizing effect and a heat-decomposable resin as a binder; and a heat-resistant silicone pressure sensitive adhesive, which is decomposed at a carburizing, nitriding or oxidizing temperature, provided on one side of the film.

10 Claims, No Drawings

PATCH FOR PREVENTING CARBURIZATION, NITRIDING OR OXIDATION, AND METHOD OF PREVENTING CARBURIZATION, NITRIDING OR OXIDATION

This application is a continuation of application Ser. No. 07/613,686, filed on Nov. 20, 1990, now abandoned.

FIELD OF THE INVENTION

This invention relates to a patch for preventing carburization, nitriding or oxidation which is used in the case of carburizing or nitriding a portion of a steel or other metallic part to harden the portion while preventing the carburization or nitriding of the other portions to maintain the toughness of the other portions, or used for preventing a metallic part or the like from surface oxidation or carburization due to a heat treatment, and relates also to a method of preventing carburization, nitriding or oxidation by use of the patch.

DESCRIPTION OF THE PRIOR ART

Metallic mechanical parts such as cams, shafts, pistons, pins, etc., used for automobiles, ships and the like are required to be tough, in whole, and to have a high level of wear resistance at portions thereof subjected friction. A method of obtaining a mechanical part having both high toughness and wear resistance as known in which a tough steel material is hardened, by carburization or nitriding, only at the portion thereof required to have wear resistance. In this case, masking the other portions of the steel material than the portion to be hardened is adopted for preventing the other portions from carburization or nitriding, thereby maintaining the toughness of the other portions. On the other hand, in a heat treatments of a metallic part, for instance, there are some cases where oxidation, decarburization or the like of a specified portion of the metallic part must be prevented assuredly. In such a case, the portion to be prevented from oxidation must be masked so as to prevent the contact of the portion with an oxidizing atmospheric gas.

As a masking material of this type, there have hitherto been used copper plating and tin plating. Because the plating operation for masking is complicated and troublesome, however, a masking material of a coating type for forming a gas barrier film has recently been developed, and has been coming rapidly to wide use. The coating type masking material comprises a powder of a chemical having an anti-carburization, anti-nitriding or anti-oxidation action, such as borax, borosilicic acid, tin powder, etc., blended with small amounts of a resin and a solvent. At the time of a heat treatment such as carburization, nitriding, etc., the coating type masking material is applied to a specified portion of a steel material, and the steel material thus coated is heated to a temperature of from 300° to 1000° C. in a furnace which is charged with a carburizing, nitriding or oxidizing agent or which is filled with a carburizing, nitriding or oxidizing gas atmosphere. Upon the heating, the resin in the coating is lost through thermal decomposition and, simultaneously, the anti-carburizing, anti-nitriding or anti-oxidizing component is fused to the surface of the steel material to form an anti-carburizing, anti-nitriding or anti-oxidizing film. The film thus formed prevents the contact of the coated portion of the steel material with a carburizing, nitriding or oxidizing component, thereby preventing the carburization, nitriding or oxidation of the coated portion. In this case, if the anti-carburizing, anti-nitriding or anti-oxidizing film is ununiform or has pinhole defects or the like, the intended prevention of carburization, nitriding or oxidation is not achievable. Therefore, it is the most important point here to provide an anti-carburizing, anti-nitriding or anti-oxidizing film which is free of defects and is uniform.

In the coating material, however, the amount of the resin component serving as a vehicle is small (If the amount is large, decomposed gases will be released in large amounts upon thermal decomposition of the resin component, thereby hindering the fusing of the anti-carburizing, anti-nitriding or anti-oxidizing film to the steel surface portion.), and the coating material is accordingly poor in spreadability. Thus, in order to form a uniform coating, it is necessary for the coating material to be diluted by a solvent and be applied repeatedly. The necessity leads to the need for elaborate work using a brush or the like and for much labor.

This invention has been made in consideration of the above-mentioned circumstances.

It is accordingly an object of this invention to provide a material for preventing carburization, nitriding or oxidation of a patch type which enables formation of a film having an excellent anti-carburization, anti-nitriding or anti-oxidation effect through a simple means.

It is another object of this invention to provide a method of preventing carburization, nitriding or oxidation of an arbitrary portion of a metallic member by use of the material for preventing carburization, nitriding or oxidation.

DISCLOSURE OF THE INVENTION

The patch for preventing carburization, nitriding or oxidation according to this invention is a patch-type material comprising a pressure sensitive adhesive layer on one side of a film-shaped material formed from a heat-fusible or heat-meltable particulate material having an anti-carburizing, anti-nitriding or anti-oxidizing action by use of a heat-decomposable resin as a binder. The patch for preventing carburization, nitriding or oxidation is applied to a portion to be prevented from being carburized, nitrided or oxidized of a metallic member to be subjected to a carburizing, nitriding or oxidizing treatment, and the whole of tile metallic member is exposed to carburizing, nitriding or oxidizing conditions, whereby it is possible to carry out carburization, nitriding or oxidation of the non-patched portions of the metallic member while preventing the patched portion from being carburized, nitrided or oxidized.

BEST MODE FOR CARRYING OUT THE INVENTION

The present inventors have made various studies for developing a new anti-carburizing technique as a substitute for copper plating or anti-carburizing, anti-nitriding or anti-oxidizing coating materials, and, as a result of the studies, have acquired the following idea.

The present inventors have come to consider that when components for forming a film for preventing carburization, nitriding or oxidation are formed into a film shape and an adhering function, such as the function of a pressure sensitive adhesive tape, is imparted to the film-shaped material, it will be possible to form an anti-carburizing, anti-nitriding or anti-oxidizing film simply by attaching the film-shaped material to a surface of a substrate. As a result of the present inventors' studies for carrying out the ideal, it has been confirmed that when a heat-fusible or heat-meltable inorganic powder having an anti-oxidation, anti-nitriding or anti-oxidation performance is formed into a film shape by use of a heat-decomposable resin as a binder and the film-shaped material is provided with a pressure sensitive adhesive layer on one side thereof, it is possible to form an anti-carburizing, anti-nitriding or anti-oxidizing film simply by applying the film-shaped material to a portion to be prevented from carburization, nitriding or oxidation. It should be particularly noted in this case that the film comprising the anti-carburizing, anti-nitriding or anti-oxidizing component has such appropriate pliability and strength as to enable application of the film to any portion to be prevented from carburization, nitriding or oxidation and that the resin and the pressure sensitive adhesive are thermally decomposed in a heating step for carburization, nitriding or oxidation, thereby fusing the anti-carburizing, anti-nitriding or anti-oxidizing component securely to the substrate surface in the form of a uniform film free of pinhole defects. In this invention, therefore, a heat-fusible or heat-meltable inorganic material (inclusive of metal) which has an anti-carburizing, anti-nitriding or anti-oxidizing function and which is in a particulate form capable of being kneaded uniformly with the heat-decomposable resin is used as the anti-carburizing, anti-nitriding or anti-oxidizing component. The particles of the particulate material, upon thermal decomposition of the resin, are fused or melted together and fused to the substrate surface to form the anti-carburizing, anti-nitriding or anti-oxidizing film. Materials usable as the particulate material include, for example, borax, boron oxide, borosilicic acid, phenylboric acid, water glass, frit, low melting point glass; powder or crushed foils of metals such as copper, tin, Al, zinc, Ni, etc., and so on. If required, two or more of these materials may be used in combination. The particles of the particulate material may take various shapes on a microscopic basis, such as spheroidal, flaky. pellet-like, short fiber-like, crushed irregular shapes and the like shapes.

When the particulate material is used together with an adjuvant, which will be mentioned below, the heat-fusible particulate material is restrained from flowing upon melting under heat, whereby a more uniform gas barrier film is obtainable. In addition, the adjuvant has the function of accelerating the dispersion of the particulate material into the binder, facilitating the formation of the film, or enhancing the surface strength of the film. Materials usable as the adjuvant include, for example, powders of titanium oxide, iron oxide, zinc oxide, talc, calcium carbonate, mica, silica (fused silica, Aerosil, etc.), alumina, magnesia, silicon carbide, fly-ash, graphite, silicic acid, kaolinite, clay, etc., at least one of which may be used singly or in combination.

The resin to be used as the binder component for forming tile anti-carburizing, anti-nitriding or anti-oxidizing component into a film shape may be any of those resins which have appropriate tensile strength and flexibility and which are lost through thermal decomposition under the carburizing, nitriding or oxidizing conditions. In total consideration of dispersibility of the anti-carburizing. anti-nitriding or anti-oxidizing component, physical properties of the film, cost, etc., the most preferable ones of the usable resins are polyolefin resins such as polyethylene, polypropylene, etc., acrylic resins, polyester resins, polyamide resins, polyurethane resins, natural or synthetic rubbers, and the like, among which especially preferred is polyethylene.

The mixing ratio of the anti-oxidizing, anti-nitriding or anti-oxidizing component and the resin may be determined appropriately, taking into account the physical properties of the composition film obtained, the amount of gases generated upon thermal decomposition, fusibility of the anti-carburizing, anti-nitriding or anti-oxidizing film, the anti-oxidation, anti-nitriding or anti-oxidation performance, and so on. If the amount of the resin is too large, however, the amount of the anti-carburizing, anti-nitriding or anti-oxidizing component is reduced relatively, leading to a higher possibility of pinhole defects or the like being generated in the anti-carburizing, anti-nitriding or anti-oxidizing film. Furthermore, the amount of the gases generated upon thermal decomposition of the resin is increased, resulting in poorer fusing of the anti-carburizing, anti-nitriding or anti-oxidizing film to the substrate surface. If the amount of the resin is insufficient, on the other hand, the resultant film becomes fragile with the attendant lowering in pliability, thereby making it difficult to adhere the film securely to the substrate surface by application. It is therefore recommendable that the anti-carburizing, anti-nitriding or anti-oxidizing component and the binder resin are mixed in a weight ratio (of the component to the resin) of 20–95:80–5, preferably 30–80:70–20, and more preferably 40–70:60–30. The preferable ranges should not be construed as limiting the invention, because the recommendable mixing ratio varies greatly depending on the kinds of the anti-carburizing, anti-nitriding or anti-oxidizing component and the binder resin. The layer constituting the anti-carburizing, anti-nitriding or anti-oxidizing film can be formed by a method wherein a dope containing the anti-carburizing, anti-nitriding or anti-oxidizing component and the binder resin is cast into a film, a method wherein a molten kneaded mixture of the anti-carburizing, anti-nitriding or anti-oxidizing component and the resin is press molded, or tile like methods. Taking into accound the workability in molding or forming, etc., the most preferred of these methods is a method in which the anti-carburizing, anti-nitriding or anti-oxidizing component is kneaded into the binder resin (e.g., polyethylene) with heating, and the kneaded mixture is formed into a film by melt extrusion.

The thickness of the film-shaped material comprising the anti-carburizing, anti-nitriding or anti-oxidizing component and the binder resin may be appropriately determined according to the kind of the anti-carburizing, anti-nitriding or anti-oxidizing component, the proportion of the component, or the required degree of prevention of carburization, nitriding or oxidation. The thickness is generally in the range from 100 to 400 $\mu m$, preferably from 150 to 300 $\mu m$, and more preferably from 180 to 250 $\mu m$.

The pressure sensitive adhesive layer provided on one side of the composition film displays the function of adhering the film to a portion to be prevented from being carburized, nitrided or oxidized of a substrate. The pressure sensitive adhesive layer may be any one that shows a pressure sensitive adhesive property at normal temperature, maintains the pressure sensitive adhesiveness sufficient for keeping the film unreleased from the patched portion until the anti-carburizing, anti-nitriding or anti-oxidizing component is melted and fused to the surface of the substrate, and that is capable of thermal decomposition under the carburizing, nitriding or oxidizing conditions. For instance, a pressure sensitive adhesive comprising rosin, a petroleum resin or the like compounded as a pressure sensitive adhesive component in a synthetic or natural rubber, a silicone pressure sensitive adhesive, etc., may be used for forming the pressure sensitive adhesive layer. Where the pressure sensitive adhesive lacks heat resistance, however, the film would be released from the patched portion before the anti-carburizing, anti-nitriding or anti-oxidizing component is melted and fused to the substrate surface. In that case, it is impossible for the film to display the anti-carburizing, anti-nitriding or anti-oxidizing function. It is therefore desirable to use a heat-resistant pressure sensitive adhesive which retains a pressure sensitive adhesive force even at temperatures of not lower than 200° C., preferably not lower than 250° C. and, particularly, shows a further increase in the adhesive force when being heated to about 150° C. after applied to a desired portion of the substrate surface. Though a silicone pressure sensitive adhesive may be mentioned as a typical example of the pressure sensitive adhesive having such properties, other pressure sensitive adhesives can also be used, naturally, as the preferable pressure sensitive adhesive.

The pressure sensitive adhesive layer is intermediately located between the layer containing the anti-carburizing, anti-nitriding or anti-oxidizing component and the substrate when the film-shaped material is applied to the substrate, and the gases generated upon thermal decomposition of the pressure sensitive adhesive layer are considered to produce a particularly great influence on the fusing of the anti-carburizing, anti-nitriding or anti-oxidizing film to the substrate. Therefore, it is preferable that the pressure sensitive layer is as thin as possible, in such a range as as not to hinder the adhesion upon application to the substrate, and the thickness is desirably controlled to or below about 20 $\mu$m. An anti-carburizing, anti-nitriding or anti-oxidizing component may be incorporated in the pressure sensitive adhesive layer in a small amount in such a range as not to hinder the pressure sensitive adhesive property.

The patch according to this invention comprises, fundamentally, the film containing the anti-carburizing, anti-nitriding or anti-oxidizing component and the pressure sensitive adhesive, as mentioned above. In putting the patch into practical use, it is extremely convenient to laminate the film with a release paper on the pressure sensitive adhesive layer side, for enhancing handleability of the patch, and to release the release paper at the time of using the patch. Besides, when the film containing the anti-carburizing, anti-nitriding or anti-oxidizing component is laminated on the upper side thereof with a resin film, a paper, a synthetic paper or the like as a support layer, the film containing the anti-carburizing, anti-nitriding or anti-oxidizing component, even if somewhat brittle, is advantageously reinforced by the support layer. Furthermore, a trade name, directions for use or the like may be printed on the support layer.

Where the patch according to this invention is commercialized in the form of a roll of an elongate patch material, a release agent may be applied to the surface of the support layer and the patch material be rolled with the pressure sensitive adhesive layer in contact with the release agent.

The constituents, operation and effect of this invention will now be described in detail while referring to the following examples and comparative examples, it being to be understood that the examples are not to be construed as limiting the invention.

EXAMPLE 1

A silicone pressure sensitive adhesive (trade name "KR-120", a product by The Shin-Etsu Chemical Co., Ltd.) was applied to a release paper, and dried to form a pressure sensitive adhesive layer 10 $\mu$m thick. Separately, a $B_2O_3$ powder as an anti-carburizing component was mixed with an acrylic resin (trade name "Acrydic A-126-50", a product by Dainippon Ink & Chemicals, Inc.) in solid matter weight ratios of 8/2 and 9/1, and each of the resultant mixtures was kneaded uniformly. Each of the kneaded mixtures was applied to the pressure sensitive adhesive layer in such an amount as to obtain a dry film thickness of 200 $\mu$m, and dried to form a film. The release paper was released from each of the thus obtained films, and the film was applied to a round bar of SCM 415 steel along the circumference of the bar. The round bars with the film applied thereto were placed in a vacuum carburizing furnace, and preheated at 700° C. for 30 minutes. Then, the bars were carburized for 1 hour under the conditions of 1040° C. and 300 Torr by blowing a methane gas into the furnace, then maintained at 800° C. for 1 hour, and quenched in oil. After the carburization was over, it was confirmed that a uniform anti-carburizing film was still remaining at the patched portions of the round bars. Upon oil quenching, the film was released completely, leaving little stain. The test pieces were split along the lengthwise direction thereof, and subjected to observation of the carburized condition. It was found that the patched portions had not been carburized at all, which indicates the excellent anti-carburizing effect of the patches.

EXAMPLE 2

A $B_2O_3$ powder as an anti-carburizing component was admixed with 10% by weight of titanium oxide as a coloring agent to prepare a powdery filler. The filler was mixed with a polyester resin (trade name "Polyester LP-035", a product by The Nippon Synthetic Chemical Industry Co., Ltd.) in a solid matter weight ratio of 7/3, followed by kneading and dispersing. The resultant mixture was applied to a 20-$\mu$m thick aluminum foil in a dry film thickness of 200 $\mu$m. The film thus obtained was coated with a silicone pressure sensitive adhesive (trade name "YR-3286", a product by Toshiba Silicone Go., Ltd.) in a thickness of 15 $\mu$m to form a pressure sensitive adhesive layer. A release paper was placed on the pressure sensitive adhesive layer to obtain a specimen.

The release paper was released from the film obtained as above, and the film was subjected to an anti-carburization test under the same conditions as in Example 1, upon which a good anti-carburizing effect was observed. The aluminum foil layer, exposed to the surface, did not show any hindrance to the anti-carburizing effect. Instead, the aluminum foil layer was found to make it easier for the film to conform to bending at the time of application to the steel under test, and was found to serve to reinforce the film.

EXAMPLE 3

An anti-carburizing component consisting of borax ($Na_2B_4O_7$) and phenylboric acid ($C_6H_5B(OH)_2$) in a weight ratio of 95/5 was kneaded with molding polyethylene pellets (trade name "D-1021", a product by Sumitomo Chemical Co., Ltd.) in a weight ratio of the anti-carburizing component to polyethylene of 30/70 in a heating-type kneader to prepare a compound, which was then press molded to be a 300 μm thick film. The same pressure sensitive adhesive as used in Example 2 was applied to one side of the thus obtained film in a thickness of 10 μm, thereby forming a pressure sensitive adhesive layer, and a release paper was attached to the layer to obtain an anti-carburizing film.

The release paper was removed from the anti-carburizing film obtained as above, then the film was applied to a steel material (S15CK), and the steel material with the film thereon was subjected to a 950° C.×5 hr carburization test by a solid carburization method.

Upon the carburization test, the patched portion was found to have not been carburized, indicating a good anti-carburizing effect of the anti-carburizing film. The portion at which the anti-carburizing effect was confirmed was subjected to X-ray analysis, which revealed no presence of boron or silicon used as the anti-carburizing material, and revealed the absence of any foreign matter mixed into the steel. Besides, polyethylene is pliable and has sufficient film strength for handling.

EXAMPLE 4

By using boron oxide as an anti-carburizing component and polyethylene in a weight ratio of 50/50, a compound was prepared in the same manner as in Example 3. The compound was extruded at 160° to form a film 40 cm wide and 200 μm thick.

The same pressure sensitive adhesive as used in Example 2 was applied to one side of the thus obtained film to form a 15 μm thick pressure sensitive adhesive layer, whereas a silicone release agent (trade name "KS-716", a product by The Shin-Etsu Chemical Co., Ltd.) was applied to the other side of the film to form a release layer. The film was made to be a rolled type test film.

A sample cut from the rolled film was applied to a steel material (SAE 5120), and subjected to a carburization test by a gas carburization method. The carburization was carried out at 930° for 5 hours, followed by homogenizing at 930° C. for 30 minutes, and by primary quenching in oil after 880° C. ×30 min heating. As a result, the portion to which the film had been applied showed no carburization. The surface hardness of the quenched steel material was measured by a Vickers hardness test, which gave a hardness value of 880 for the carburized portion and a hardness value of 285 for the portion prevented from carburization. Thus, a good anti-carburizing effect was confirmed. Besides, the film was easy to remove after the test.

EXAMPLE 5

A mixture of 50 parts by weight of low density polyethylene, 45 parts by weight of boron oxide, 3.5 parts by weight of titanium oxide and 1.5 parts by weight of Aerosil was kneaded with heating in a kneader, and the kneaded mixture was melt extruded at 259° C. to prepare a film 300 μm thick. An acrylic pressure sensitive adhesive (trade name "AS-6000", a product by Ipposha Oil Industries Co., Ltd.) was applied to one side of the film in a coating weight of 30 g/m² as solids, to obtain an anti-carburizing patch.

The patch was applied to a round steel bar (S55CK), and a 900° C. ×5 hr carburization test was carried out by a solid carburization method.

After the carburization test, the patch was removed to examine the carburized condition of the steel bar. The patched portion was found to be little carburized, and the good anti-carburizing effect of the patch was thus confirmed. Upon an X-ray analysis of the portion prevented from carburization, boron oxide used as the anti-carburizing material was not recognized to be mixed in the portion.

EXAMPLE 6

A mixture of 50 parts by weight of low density polyethylene with 50 parts by weight of 350-mesh crushed tin powder (a product by Fukuda Metal Foil & Powder Co., Ltd.) was kneaded with heating in a kneader, and the kneaded mixture was melt extruded at 250° C. to be a film 250 μm thick. A silicone pressure sensitive adhesive (trade name "K-120", a product by The Shin-Etsu Chemical Go., Ltd.) was applied to the back side of the film in a thickness upon drying of 10 μm, to obtain an anti-nitriding patch.

The anti-nitriding patch was applied to an Al-Cr-Mo steel bar having a carbon content of from 0.35 to 0.5%. After the steel bar with the patch thereon was subjected to a 500° C. ×25 hr nitriding treatment, the patch was removed to observe the structure of the surface of the steel. It was confirmed upon the observation that the patched portion had been prevented substantially perfectly from being nitrided.

EXAMPLE 7 mixture of 50 parts by weight of low density polyethylene, 20 parts by weight of boron oxide, 4 parts by weight of titanium oxide, 24.9 parts by weight of borosilicic acid frit and 1.5 parts by weight of Aerosil was kneaded with heating in a kneader, and the kneaded mixture was melt extruded at 250° C. to be a film 250 μm thick.

An acrylic pressure sensitive adhesive (trade name "AS-6000", a product by Ipposha Oil Industries go., Ltd.) was applied to one side of the film in a coating weight of 30 g/m² as solids, to obtain an anti-oxidizing patch. The patch was applied to a stainless steel bar (SUS 304), and the steel bar with the patch thereon was subjected to an oxidizing treatment at 1000° C. for 1 hour. After the oxidizing treatment, the patch was removed to examine the oxidized condition of the steel. The examination confirmed that the patched portion had not been oxidized at all.

EXAMPLE 8

A mixture of 30 parts by weight of an ethyrenvinyl acetate copolymer (trade name "E-2031", a product by Sumitomo Chemical Co., Ltd.), 65 parts by weight of boron oxide and 5 parts by weight of iron oxide (red oxide) was kneaded with heating in a kneader, and the kneaded mixture was melt extruded at 230° C. to form a film 120 μm thick. A silicone pressure sensitive adhesive (trade name "YR-3340", a product by Toshiba Silicone Co., Ltd.) was applied to one side of the film in a thickness upon drying of 10 μm, to obtain an anti-carburizing patch.

The patch was applied to a Cr-Mo steel bar, and the steel bar with the patch thereon was subjected to a gas carburization treatment at 940° C. for 13 hours. After the treatment, the patch was removed, and measurement of Rockwell hardness was carried out to examine the anti-carburizing effect of the patch. The hardness of the patched portion was much lower than the hardness of the non-patched portions, which confirms that carburization of the patched portion had been prevented substantially perfectly.

COMPARATIVE EXAMPLE 1

An anti-carburizing paint "Ceramic Paint No. 2", a product by Nippon Kagaku Engineering Co., Ltd., was applied once, twice or thrice to the same SCM 415 steel bar as used in the Examples, along the circumference of the bar. The dry film thickness of the coating was about 100 μm per application. The bar with the coatings thereon was subjected to the same carburization test as in Example 1. It was confirmed upon the test that the portion coated thrice with the anti-carburizing paint had been prevented substantially perfectly from carburization, but the portion coated once and the portion coated twice showed, in part, unsatisfactory prevention of carburization and were unsatisfactory in reliability of toughness.

INDUSTRIAL APPLICABILITY

This invention, constituted as described above. provides a patch-type material for preventing carburization, nitriding or oxidation which makes it possible to simplify remarkably the masking operation for prevention of carburization, nitriding or oxidation and to obtain a highly reliable preventive effect on carburization, nitriding or oxidation. In addition, the patch according to the invention is capable of being commercialized in the form of labels or a roll of elongate material, and is therefore convenient for handling, transportation, storage, etc., and extremely high in practicability.

We claim:

1. A high temperature resistant patch for preventing carburization, nitriding or oxidation which comprises
    a film comprising a heat-fusible or heat-meltable particulate material which is at least one member selected from the group consisting of borax, boron oxide, borosilicic acid, phenylboric acid, water glass, frit, low melting point glass of 300°–500° C., and a powder or crushed foil of a metal having a melting point of not higher than 900° C. having an anti-carburizing, anti-nitriding or anti-oxidizing effect, and a heat-decomposable polyolefin resin as a binder; and
    a heat-resistant silicone pressure sensitive adhesive which retains its pressure sensitive adhesive force, which is decomposed at a carburizing, nitriding or oxidizing temperature, provided on a side of the film, wherein an inhibitor of flow of the heat-meltable particulate material at the time of heating is incorporated as an adjuvant in said film, wherein the adjuvant is at least one member selected from the group consisting of titanium oxide, iron oxide, zinc oxide talc, calcium carbonate, silica, aluminum silicate, alumina, zircon, zirconia, magnesia, Silicon carbide, fly-ash, graphite and kaolinite, and wherein from 20 to 95 parts by weight of the particulate material is blended with from 5 to 80 parts by weight of the heat-decomposable polyolefin resin.

2. The patch as set forth in claim 1, wherein the powder or crushed foil of a metal is a powder or crushed foil of at least one metal selected from the group consisting of copper, *tin, aluminum, zinc and nickel.

3. The patch as set forth in claim 1, wherein the heat-decomposable resin is a homopolymer or copolymer of ethylene.

4. The patch as set forth in claim 1, wherein from 30 to 80 parts by weight of the particulate material is blended with from 20 to 70 parts by weight of the heat-decomposable polyolefin resin.

5. The patch as set forth in claim 1, wherein from 70 to 40 parts by weight of the particulate material is blended with from 30 to 60 parts by weight of the heat-decomposable polyolefin resin.

6. The patch as set forth in claim 1, wherein the film thickness of said film is from 100 to 400 μm.

7. The patch as set forth in claim 1, wherein said film is formed by a melt extrusion from a heated and kneaded mixture of the heat-decomposable resin and the heat-fusible or heat-meltable particulate material having the anti-carburizing, anti-nitriding or anti-oxidizing effect.

8. The patch as set forth in claim 1, wherein a support layer is provided on said film on the side opposite to the pressure sensitive adhesive layer.

9. The patch as set forth in claim 1, wherein a release paper is attached to the side of the pressure sensitive adhesive layer opposite to said film.

10. A method of preventing carburization, nitriding or oxidation which comprises
    applying a high temperature resistant patch to a portion of a metallic member to be heat-treated to be prevented from being carburized, nitrided or oxidized through pressure sensitive adhesion, thereby protecting the patched portion from carburization, nitriding or oxidation;
    said high temperature resistant patch comprising a film comprising a heat-fusible or heat-meltable particulate material which is at least one member selected from the group consisting of borax, boron oxide, borosilicic acid, phenylboric acid, water glass, frit, low melting point glass of 300°–500° C., and a powder or crushed foil of a metal having melting point of not higher than 900° C,. having an anti-carburizing, anti-nitriding or anti-oxidizing effect, and a heat-decomposable polyolefin resin as a binder; and a heat-resistant silicone pressure sensitive adhesive Which retains its pressure sensitive adhesive force, which is decomposed at a carburizing, nitriding or oxidizing temperature, provided on a side of the film, wherein an inhibitor of flow of the heat-meltable particulate material at the time of heating is incorporated as an adjuvant in said film, Wherein the adjuvant is at least one member selected from the group consisting of titanium oxide, iron oxide, zinc oxide, talc, calcium carbonate, silica, aluminum silicate, alumina, zircon, zirconia, magnesia, silicon carbide, fly-ash, graphite and kaolinite, and wherein from 20 to 95 parts by weight of the particulate material is blended with from 5 to 80 parts by weight of the heat-decomposable polyolefin resin.

* * * * *

UNITED STATES PATENT AND TRADEMARK OFFICE
CERTIFICATE OF CORRECTION

PATENT NO. : 5,330,813
DATED : July 19, 1994
INVENTOR(S) : Kouichi HIROOKA, et al.

It is certified that error appears in the above-indentified patent and that said Letters Patent is hereby corrected as shown below:

On the title page, Item [63] and Column 1, Lines 7 and 8, the Related U.S. Application Data should read as follows:

--Continuation of Ser. No. 613,686, Nov. 20, 1990, filed as PCT/JP90/00423 on Mar. 29, 1990, abandoned.--

Signed and Sealed this

First Day of November, 1994

Attest:

BRUCE LEHMAN

Attesting Officer

Commissioner of Patents and Trademarks